July 4, 1944. A. G. ANDERSON ET AL 2,352,677
ARTIFICIAL FOG PRODUCTION
Filed Nov. 10, 1942
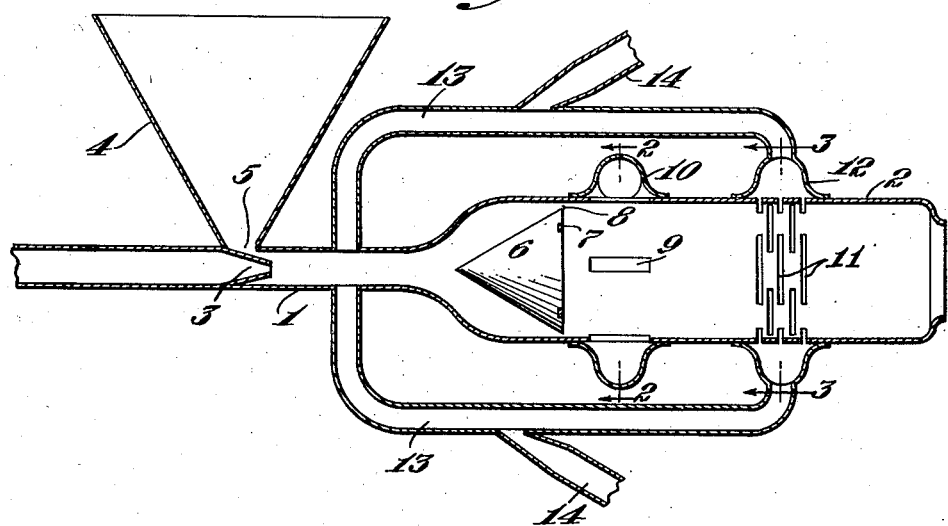
Fig. 1
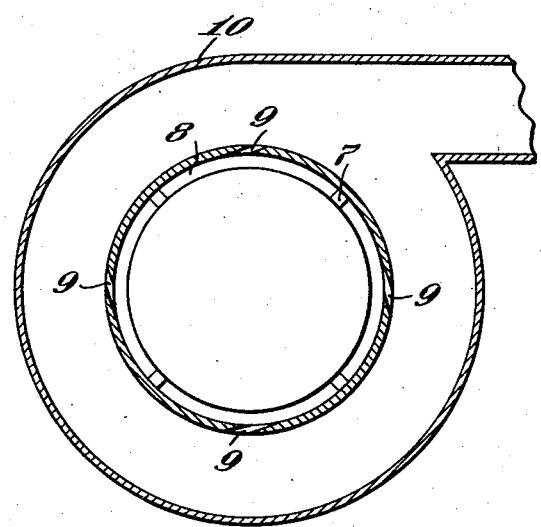
Fig. 2
Fig. 3
Inventors
Anton G. Anderson
Thomas S. Derr
by Roberts, Cushman & Woodbury
Att'ys.

Patented July 4, 1944

2,352,677

UNITED STATES PATENT OFFICE 2,352,677

ARTIFICIAL FOG PRODUCTION

Anton G. Anderson, Arlington, and Thomas S. Derr, Newton, Mass., assignors of one-third to American Steam Automobile Company, Middlesex County, Mass., a corporation of Massachusetts Application November 10, 1942, Serial No. 465,152

10 Claims. (Cl. 252—359)

This invention relates to the production of an artificial fog or smoke of finely divided liquid or solid material for use as a screen or for any other purpose, the objects being to produce a fog rapidly, extensively and at low cost, without risk of fire or explosion and with material which is inexpensive and readily available in large quantities and which is harmless to men and equipment, to start the production of the fog on short notice, to produce a fog of any desired color, and quickly to change the color of the fog.

According to the present invention the fog producing apparatus comprises a conduit through which a stream of gaseous fluid may flow, the conduit having a restricted annular passageway and peripheral orifices entering the conduit tangentially near the exit end of the passageway, together with means for introducing finely divided solid material into the stream in advance of the passageway and means for introducing gaseous fluid through the aforesaid orifices, thereby to atomize or disperse the material and to thoroughly mix it with the stream and impart a spiral motion to the stream. The means for introducing the finely divided solid material into the aforesaid stream preferably comprises a nozzle from which gaseous fluid issues at high velocity, together with a hopper or other suitable means for delivering the material into the high velocity jet issuing from the nozzle. The aforesaid annular passageway is preferably formed by a baffle mounted in the passageway with its apex directed toward the nozzle and its base spaced closely to the inner periphery of the conduit. The aforesaid orifices may have any desired degree of circumferential inclination so long as they have a tangential component, and they may also be inclined in either direction relative to planes perpendicular to the axis of the conduit. Beyond the orifices the conduit may be provided with peripheral openings through which unatomized particles are thrown by centrifugal force, and means may be provided for returning these undispersed particles to the conduit in advance of the aforesaid passageway so that they may again be subjected to the atomizing or dispersing action of the jets issuing through the tangential orifices.

The gaseous fluid may comprise compressed air or other gas or vapor under pressure or steam preferably superheated. For example with steam at 200 lbs. per square inch pressure and 700° F. total temperature ground clay may be dispersed in the steam at the rate of 1 lb. of clay per 2 lbs. of steam used. Good results may also be obtained with compressed air at a pressure of about 5 lbs. per square inch. Clay, soft coal and salt are some of the many materials which may be dispersed in the steam or gas according to the present invention.

For the purpose of illustration a typical embodiment of the invention is shown in the accompanying drawing in which Fig. 1 is a central longitudinal section through the apparatus;

Fig. 2 is a section on line 2—2 of Fig. 1; and

Fig. 3 is a section on line 3—3 of Fig. 1.

The particular embodiment of the invention chosen for the purpose of illustration comprises a conduit 1 having an enlarged portion 2, a nozzle 3 located in the smaller portion 1, and a hopper 4 from which powdered or granular material may be fed through the outlet 5 to the conduit 1 in the region of the nozzle 3. Mounted in the larger portion 2 of the conduit coaxially with the conduit is a conical baffle 6 which is held in place by spaced lugs 7 with its apex directed toward the nozzle 3 and with a restricted annular passageway 8 between the edge of its base and the inner periphery of the larger portion 2 of the conduit. Beyond the baffle 6 the conduit is provided with orifices 9 which enter the conduit tangentially as shown in Fig. 2. These orifices may be circular or in the form of slots as shown in Fig. 1. Surrounding the conduit over the orifices is a casing 10 through which the superheated steam or other gaseous fluid may be introduced. Beyond the orifices 9 the conduit may be provided with circumferential slots 11 through which undispersed particles may escape. Surrounding the conduit in the region of the slots 11 is a casing 12 communicating through pipes 13 with the conduit 1 between the nozzle 3 and the baffle 6. To expedite the return of the undispersed particles to the conduit jets of gaseous fluid may be introduced obliquely into the pipes 13 through branches 14.

As the powdered or granular material is fed from the hopper 4 into the high velocity jet of gaseous fluid issuing from the nozzle 3, the finely divided material, if not already finely divided, is pulverized by the jet to some extent. Then the pulverized particles impinges upon the conical baffle 6 at considerable velocity, thereby breaking up the particles more finely. The finely divided particles are then carried through the annular passageway 8 in the form of a cylindrical stream. As this stream issues from the passageway it is acted upon by the jets of gaseous fluid tangentially through the orifices 9. Thus the particles are effectively dispersed and mixed thoroughly throughout the stream and the stream is given a spiral motion. While the number of orifices is not critical, the orifices should be spaced closely enough together to produce a rotating vortex effective to disperse substantially all of the particles as a result of the impact of the jets on the particles and the impact of the particles on each other and on the conduit under the influence of the jets. However, if any particles remain undispersed they are thrown outwardly through the slots 11 by the centrifugal force of the rotating stream. The slots 11 are preferably located near the exit end of the conduit 2 where the fluid pressure is considerably reduced, but of course some fluid will also escape through the slots. This escaping fluid may be sufficient to carry the particles back to the conduit 1, but if not additional fluid may be admitted through the inlets 14 to help the circulation. The particles are apt to be electrified by their friction against the wall of the apparatus, which electrification assists in their dispersion due to their mutual electrical repulsion.

From the foregoing it will be evident that the artificial fog or smoke will begin to issue from the exit end of the conduit 2 at almost the moment fluid is admitted to the nozzle 3, that the stream of fog will issue rapidly and quickly spread over a wide area, that the color of the fog may be regulated by choosing solid material of the desired hue, and that the color of the fog may be changed on short notice by feeding material having a different color into the hopper 4.

By providing an extension on the outlet end of the conduit 2 the device may also be used as a howler or siren, and by making the extension movable the amount of noise may be changed. For example, the extension may be pivoted to swing to one side or it may telescope into or over the conduit. As shown in Fig. 1, the outlet end of the conduit 2 may be somewhat restricted to deflect the peripheral portion of the stream toward the axis of the conduit.

It should be understood that the present disclosure is for the purpose of illustration only and that this invention includes all modifications and equivalents which fall within the scope of the appended claims.

We claim:

1. Apparatus for producing artificial fog comprising a conduit having a reduced portion merging with an enlarged portion through which a stream of gaseous fluid may flow, the enlarged portion of said conduit containing a conical baffle with its apex directed toward the reduced portion of the conduit and forming a restricted passageway around its base, the conduit also having peripheral orifices entering the conduit tangentially near the exit end of the passageway, means for introducing pulverized material into said stream in advance of the conical baffle, and means for introducing gaseous fluid at high velocity through said orifices, thereby to disperse said material in and thoroughly mix it with said stream and to impart a spiral motion to the stream.

2. Apparatus for producing artificial fog comprising a conduit having a reduced portion merging with an enlarged portion through which a stream of gaseous fluid may flow, the enlarged portion of said conduit containing a conical baffle with its apex directed toward the reduced portion of the conduit and forming a restricted passageway around its base, the conduit also having peripheral orifices entering the conduit tangentially near the exit end of the passageway, a nozzle in advance of the conical baffle for introducing gaseous fluid into the conduit to produce said stream, means associated with the nozzle for introducing pulverized material into said stream, and means for introducing gaseous fluid at high velocity through said orifices whereby to disperse said material in and thoroughly mix it with said stream and to impart a spiral motion to the stream.

3. Apparatus for producing artificial fog comprising a conduit through which a stream of gaseous fluid may flow, the conduit having a restricted annular passageway and peripheral orifices entering the conduit tangentially near the exit end of the passageway, means for introducing pulverized material into said stream in advance of the passageway, means for introducing gaseous fluid at high velocity through said orifices to disperse said material in and thoroughly mix it with said stream and to impart a spiral motion to the stream, said conduit having peripheral openings beyond said orifices through which undispersed particles are thrown by centrifugal force, and means for conducting the undispersed particles away from said orifices.

4. Apparatus for producing artificial fog comprising a conduit through which a stream of gaseous fluid may flow, the conduit having a restricted annular passageway and peripheral orifices entering the conduit tangentially near the exit end of the passageway, a nozzle in advance of the passageway for introducing gaseous fluid into the conduit to produce said stream, means associated with the nozzle for introducing pulverized material into the stream, means for introducing gaseous fluid at high velocity through said orifices to disperse said material in and thoroughly mix it with said stream and to impart a spiral motion to the stream, said conduit having peripheral openings beyond said orifices through which undispersed particles are thrown by centrifugal force, and means for conducting the undispersed particles away from said orifices.

5. Apparatus for producing artificial fog comprising a conduit through which a stream of gaseous fluid may flow, the conduit containing a conical baffle with its apex directed toward the entrance end of the conduit and forming a restricted passageway around its base, the conduit also having peripheral orifices entering the conduit tangentially near the exit end of the passageway, means for introducing pulverized material into said stream in advance of the conical baffle, means for introducing gaseous fluid at high velocity through said orifices to disperse said material in and thoroughly mix it with said stream and to impart a spiral motion to the stream, said conduit having peripheral openings beyond said orifices through which undispersed particles are thrown by centrifugal force, and means for conducting the undispersed particles away from said orifices.

6. Apparatus for producing artificial fog comprising a conduit through which a stream of gaseous fluid may flow, the conduit containing a conical baffle with its apex directed toward the entrance end of the conduit and forming a restricted passageway around its base, the conduit also having peripheral orifices entering the conduit tangentially near the exit end of the passageway, a nozzle in advance of the conical baffle for introducing gaseous fluid into the conduit to produce said stream, means associated with the nozzle for introducing solid material into said stream, means for introducing gaseous fluid at high velocity through said orifices to disperse said material in and thoroughly mix it with said stream and to impart a spiral motion to the stream, said conduit having peripheral openings beyond said orifices through which undispersed particles are thrown by centrifugal force, and means for conducting the undispersed particles away from said orifices.

7. Apparatus for producing artificial fog comprising a conduit through which a stream of gaseous fluid may flow, the conduit having a restricted annular passageway and peripheral orifices entering the conduit tangentially near the exit end of the passageway, means for introducing solid material into said stream in advance of the passageway, means for introducing gaseous fluid at high velocity through said orifices to disperse said material in and thoroughly mix it with said stream and to impart a spiral motion to the stream, said conduit having peripheral openings beyond said orifices through which undispersed particles are thrown by centrifugal force, and means for returning said undispersed particles to the conduit in advance of said passageway.

8. Apparatus for producing artificial fog comprising a conduit through which a stream of gaseous fluid may flow, the conduit having a restricted annular passageway and peripheral orifices entering the conduit tangentially near the exit end of the passageway, a nozzle in advance of the passageway for introducing gaseous fluid into the conduit to produce said stream, means associated with the nozzle for introducing pulverized material into the stream, means for introducing gaseous fluid at high velocity through said orifices to disperse said material in and thoroughly mix it with said stream and to impart a spiral motion to the stream, said conduit having peripheral openings beyond said orifices through which undispersed particles are thrown by centrifugal force, and means for returning said undispersed particles to the conduit in advance of said passageway.

9. Apparatus for producing artificial fog comprising a conduit through which a stream of gaseous fluid may flow, the conduit containing a conical baffle with its apex directed toward the entrance end of the conduit and forming a restricted passageway around its base, the conduit also having peripheral orifices entering the conduit tangentially near the exit end of the passageway, means for introducing pulverized material into said stream in advance of the conical baffle, means for introducing gaseous fluid at high velocity through said orifices to disperse said material in and thoroughly mix it with said stream and to impart a spiral motion to the stream, said conduit having peripheral openings beyond said orifices through which undispersed particles are thrown by centrifugal force, and means for returning said undispersed particles to the conduit in advance of said passageway.

10. Apparatus for producing artificial fog comprising a conduit through which a stream of gaseous fluid may flow, the conduit containing a conical baffle with its apex directed toward the entrance end of the conduit and forming a restricted passageway around its base, the conduit also having peripheral orifices entering the conduit tangentially near the exit end of the passageway, a nozzle in advance of the conical baffle for introducing gaseous fluid into the conduit to produce said stream, means associated with the nozzle for introducing pulverized material into said stream, means for introducing gaseous fluid at high velocity through said orifices to disperse said material in and thoroughly mix it with said stream and to impart a spiral motion to the stream, said conduit having peripheral openings beyond said orifices through which undispersed particles are thrown by centrifugal force, and means for returning said undispersed particles to the conduit in advance of said passageway.

THOMAS S. DERR.
ANTON G. ANDERSON.